United States Patent
Schlechtriem

(10) Patent No.: US 6,358,003 B2
(45) Date of Patent: Mar. 19, 2002

(54) ROTOR BLADE AN AXIAL-FLOW ENGINE

(75) Inventor: Stefan Schlechtriem, Berlin (DE)

(73) Assignee: Rolls-Royce Deutschland Ltd & Co. KG, Dahlewitz (DE)

(*) Notice: Subject to any disclaimer, the term of this patent is extended or adjusted under 35 U.S.C. 154(b) by 0 days.

(21) Appl. No.: 09/424,481

(22) PCT Filed: Mar. 23, 1999

(86) PCT No.: PCT/EP99/01981

§ 371 Date: Mar. 3, 2000

§ 102(e) Date: Mar. 3, 2000

(87) PCT Pub. No.: WO99/49185

PCT Pub. Date: Sep. 30, 1999

(30) Foreign Application Priority Data

Mar. 23, 1998 (DE) .......................................... 198 12 624

(51) Int. Cl.$^7$ ................................................. F01D 5/14
(52) U.S. Cl. .................. 415/181; 415/119; 416/223 A; 416/228; 416/237; 416/238
(58) Field of Search ................................. 416/228, 235, 416/237, 238, DIG. 2, DIG. 5, 223 A; 415/119, 181

(56) References Cited

U.S. PATENT DOCUMENTS

| | | | | |
|---|---|---|---|---|
| 3,467,197 A | * | 9/1969 | Spivey et al. | ................ 416/237 |
| 3,989,406 A | | 11/1976 | Bliss | |
| 4,012,172 A | | 3/1977 | Schwaar | |
| 4,714,407 A | * | 12/1987 | Cox et al. | ................ 416/223 A |

FOREIGN PATENT DOCUMENTS

| | | |
|---|---|---|
| DE | 3530769 | 8/1985 |
| EP | 0774567 | 11/1996 |
| JP | 09060501 | 4/1997 |

OTHER PUBLICATIONS

R.J. Neubert, D.E. Hobbs, and H.D. Weingold: Application of Sweep to Improve the Efficiency of a Transonic Fan Part I: Design, Jan.–Feb. 1995.

* cited by examiner

*Primary Examiner*—Christopher Verdier
(74) *Attorney, Agent, or Firm*—The Law Offices of Timothy J. Klima

(57) ABSTRACT

A rotor blade airfoil of an axial-flow turbomachine, for a fan or a compressor high-pressure stage of a gas turbine system, configured in the tip area to improve supersonic performance. The blade afflux edge has a forward-back sweep. The tip region of the blade efflux edge can be designed essentially similar to the blade afflux edge, with the tip region extending across the outer 15% to 25% of the blade span.

10 Claims, 2 Drawing Sheets

ROTOR BLADE AN AXIAL-FLOW ENGINE

This invention relates to a rotor blade airfoil of an axial-flow turbomachine, more particularly for a fan or a compressor high-pressure stage of a gas turbine system, having means in the tip area to improve supersonic performance. Associated state of the art is described in U.S. Pat. No. 3,989,406 and U.S. Pat. No. 4,012,172. The first-cited patent specification deals with the supersonic performance of rotor blade airfoils generally, while the second illustrates a forward swept airfoil, i.e. an airfoil on which the leading edge, starting from the blade root, first arches counter to the direction of flow, so that in a lateral view, the airfoil area or blade chord first continuously increases until, upon reaching a radius point, it arches in the direction of flow toward the blade tip area, where in said lateral view, the airfoil area or chord of the blade again decreases.

The present invention also relates to the sweep of rotor blade airfoils, more particularly of the first compressor high-pressure stages or of a fan of gas turbines or aircraft gas turbine engines. Owing to the high peripheral speeds of said components, and the practically zero-swirl inlet flow to the blade, supersonic regions occur in the blade tip area with mach numbers in excess of 1.4. These for several reasons negatively affect the performance of this component. Firstly, the efficiency decreases, with increasing blade span, owing to growing shock losses, much more severely than with subsonic rotors. Also, the interaction of duct shock with blade tip swirl negatively affects the stability of the flow, because large blockage regions occur in that area whose nonlinear growth ultimately determines the stability limit of the compressor.

In a broad aspect, the arrangement of the present invention provides means to remedy said problems.

It is a particular object of the present invention to provide a solution to said problems by providing a forward-back-swept blade leading edge. Further objects and advantages of the present invention will become apparent from the sub-claims.

Figure 1:
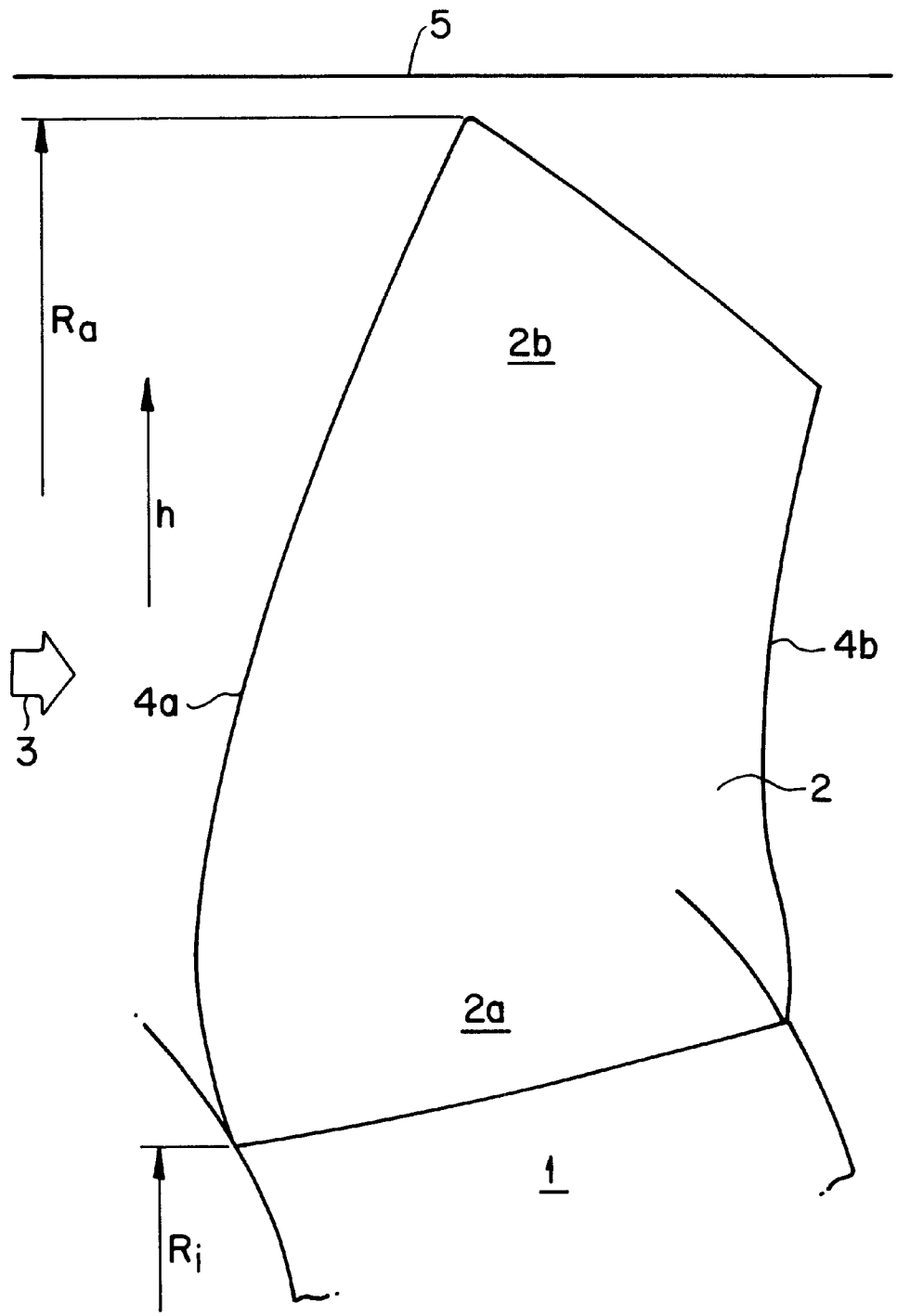
Figure 2:
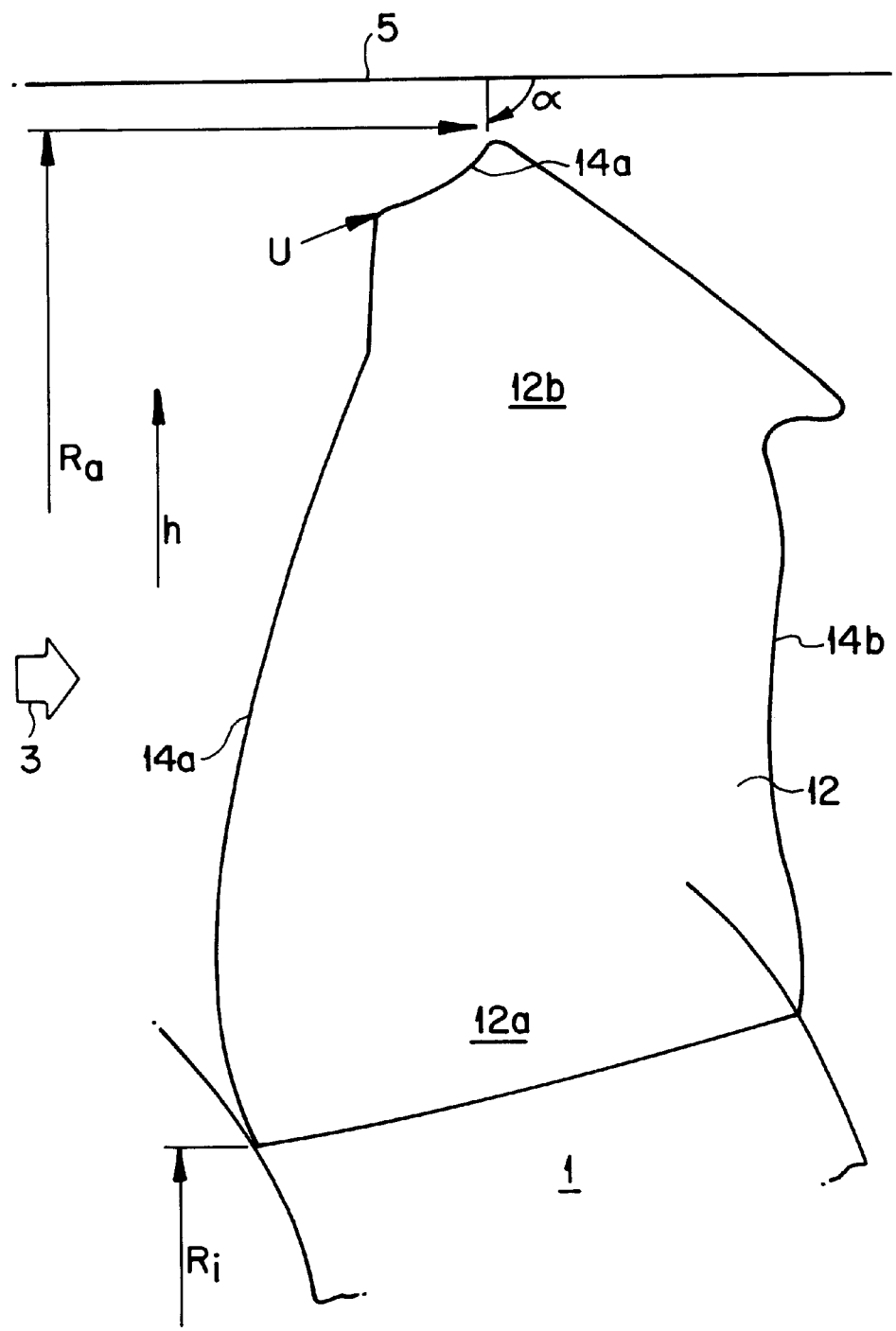

The invention is described more fully by means of a preferred embodiment in the light of two drawings showing a conventional rotor blade airfoil (FIG. 1) and the present invention (FIG. 2).

In FIG. 1, reference numeral 1 indicates the blade root and reference numeral 2 the airfoil of the rotor blade of an axial-flow turbomachine, more particularly for a fan or compressor high-pressure stage of a gas turbine system. Air is impinging on airfoil 2 in the direction of arrowhead 3 (=direction of flow 3), i.e. the left-hand leading edge of airfoil 2 is its afflux edge 4a and the right-hand trailing edge is its efflux edge 4b. The axis of rotation of the rotor, omitted on the drawing, accordingly runs parallel to the direction of flow 3 and extends (far) below the blade root 1.

As usual, airfoil 2 has a root region 2a and a tip region 2b, the latter substantially extending along the outer 15% to 25%, more particularly along about 20% of the blade span h. The latter by amount is the difference $(R_a-R_i)$, where $R_a$ is the outer radius measured from the axis of rotation and $R_i$ the inner radius of the airfoil 2. Shown in the tip region 2b is both the afflux edge 4a and the efflux edge 4b of a conventionally designed airfoil 2. A conventionally shaped airfoil of this type, however, is impaired by the disadvantages cited above.

In FIG. 2, reference numeral 1 indicates the blade root and reference numeral 12 the airfoil of the rotor blade of an axial-flow turbomachine, more particularly for a fan or compressor high-pressure stage of a gas turbine system. Air is impinging on airfoil 12 in the direction of arrowhead 3 (=direction of flow 3), i.e. the left-hand leading edge of airfoil 12 is its afflux edge 14a and the right-hand trailing edge is its efflux edge 14b. The axis of rotation of the rotor, omitted on the drawing, accordingly runs parallel to the direction of flow 3 and extends (far) below the blade root 1.

Airfoil 12 has a root region 12a and a tip region 12b, the latter substantially extending along the outer 15% to 25%, more particularly along about 20% of the blade span h. The latter by amount is less than the difference $(R_a-R_i)$, where $R_a$ is the outer radius of airfoil 2 measured from the axis of rotation and $R_i$ the inner radius of the airfoil 12. Shown in the tip region 12b is both the afflux edge 14a and the efflux edge 14b of a conventionally designed airfoil 12.

For FIG. 2 to remedy the disadvantages of FIG. 1, the airfoil 12 of the present invention is in the tip region 12b provided with a forward-back sweep at least on the blade afflux edge 14a as shown on the drawing, i.e. in this tip region 12b the blade afflux edge 14a extends, unlike in a conventional design, first counter to the direction of flow 3 and, upon reaching a radius point U, retreats in the direction of flow 3 in a manner more pronounced than with a conventionally designed blade afflux edge 4a. For mechanical reasons, an angle α of a 90° order of magnitude is sought in the uppermost region, i.e. at the blade tip, between the afflux edge 14a and the case contour indicated by line 5 of a case surrounding the rotor.

In FIG. 2 at the tip region 2b, the blade efflux edge 14b has a shape essentially similar to that of the blade afflux edge 14a, i.e. it reflects the forward-back sweep, as a comparison of the 14b (FIG. 2) with the line 4b representing the conventional design (FIG. 1) will show.

As seen in FIG. 2, the afflux edge of the tip region includes a first portion contoured away from the direction of airflow to first point, a second portion extending radially outwardly from the first point to a second point U, with the second portion being inclined with respect to the first portion toward the direction of airflow from the first point to the second point and a third portion positioned radially outwardly from the second point and receding axially from the second point and from the direction of airflow, such that the third portion includes a concave configuration.

In arrangement of airfoil 12, the back sweep can be made more pronounced than the forward sweep, so as to allow for the mach number distribution. This means that the distance, not indicated on the drawing, by which the blade afflux edge 14a in the tip region is shifted back compared with the conventional design in accordance with line 4a in FIG. 1, is larger than the distance, again not indicated, by which the blade afflux edge 14a in the radius point U area is shifted forward relative to the conventional design in accordance with line 4a in FIG. 1. On the drawing, this may look different on account of the two-dimensional representation, whereas a rotor blade airfoil is obviously a three-dimensional shape.

The sweep can also be designed such that the topmost airfoil section of a conventional rotor blade airfoil is retained. This will allow the blading in a previously existing case of an axial-flow turbomachine also to be renewed in a case with contoured walls, without having to adjust rub rings.

The forward-back sweep of the present invention primarily reduces the local afflux mach number and so reduces shock losses. In the process, the forward-back sweep does not induce greater radial velocities that would be the cause of additional losses.

A forward-back sweep also provides structural mechanical advantages, considering that the thrust, elastic axis and gravity centers will, when compared with the straight forward or back sweep, not change at all across blade span h until about 80% of the blade span, and only slightly from 80% blade span to the blade tip. Additional bending moments in the hub area, such as arising with straightforward or back sweep, are therefore avoided. The modified modes of vibration in the upper region of the airfoil 12 are above the second Engine Order or E.O., so that the arrangement of the present invention also causes no restrictions from the structural dynamic aspect. It is apparent that a plurality of especially design features other than hose described herein may be incorporated in the present embodiment without departing from the inventive concept.

LIST OF REFERENCES

1 Blade root
2 Airfoil of FIG. 1
12 Airfoil of FIG. 2
2a Root region of FIG. 1
12a Root region of FIG. 2
2b Tip region of FIG. 1
12b Tip region of FIG. 2
3 Direction of flow
4a Blade afflux edge of FIG. 1
14a Blade afflux edge of FIG. 2
4b Blade efflux edge of FIG. 1
14b Blade efflux edge of FIG. 2
5 Case contour
$R_a$ Outer radius of 2
$R_i$ Inner radius of 2
U Radius point of FIG. 2
h Blade span
α Angle between 4a and 5 of FIG. 2

What is claimed is:

1. A rotor blade of an axial-flow turbomachine, comprising:
   means in a tip region of the blade for improving supersonic performance, the means comprising a forward-back sweep of an afflux edge of the blade.

2. A rotor blade as in claim 1, wherein the tip region of an efflux edge of the blade is shaped differently than that of the blade afflux edge.

3. A rotor blade as in claim 2, wherein the tip region extends across an outer 15% to 25% of a span of the blade.

4. A rotor blade as in claim 1, wherein the tip region extends across an outer 15% to 25% of a span of the blade.

5. A rotor blade of a turbine, wherein an afflux edge of a tip region of the blade includes a first portion contoured away from the direction of airflow to a first point, a second portion extending radially outwardly from the first point to a second point, the second portion being inclined with respect to the first portion toward the direction of airflow from the first point to the second point and a third portion positioned radially outwardly from the second-point and receding axially from the second point and from the direction of airflow, such that the third portion includes a concave configuration.

6. A rotor blade as in claim 5, wherein an efflux edge of a tip region of the blade is shaped differently than the afflux edge of the tip region of the blade.

7. A rotor blade as in claim 6, wherein the tip region of the blade extends across an outer 15–25% of a span of the blade.

8. A rotor blade as in claim 5, wherein the tip region of the blade extends across an outer 15–25% of a span of the blade.

9. A turbine comprising:
   a casing; and
   a rotor blade, wherein an afflux edge of a tip region of the blade includes a first portion contoured away from the direction of airflow to a first point, a second portion extending radially outwardly from the first point to a second point, the second portion being inclined with respect to the first portion toward the direction of airflow from the first point to the second point and a third portion positioned radially outwardly from the second-point and receding axially from the second point and from the direction of airflow, such that the third portion includes a concave configuration.

10. The rotor blade as in claim 9, wherein the tip region of the blade extends across an outer 15–25% of a span of the blade.

* * * * *